United States Patent
Horn et al.

(10) Patent No.: US 11,777,681 B2
(45) Date of Patent: Oct. 3, 2023

(54) TRANSPORT BLOCK DEFINITIONS FOR DIFFERENTIAL DATA-AIDED DEMODULATION REFERENCE SIGNALS

(71) Applicant: QUALCOMM Incorporated, San Diego, CA (US)

(72) Inventors: Idan Michael Horn, Hod Hasharon (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,737

(22) Filed: Jun. 7, 2021

(65) Prior Publication Data

US 2022/0021502 A1   Jan. 20, 2022

Related U.S. Application Data

(60) Provisional application No. 62/705,874, filed on Jul. 20, 2020.

(51) Int. Cl.
*H04L 5/00* (2006.01)
*H04L 1/00* (2006.01)

(52) U.S. Cl.
CPC .......... *H04L 5/0051* (2013.01); *H04L 1/0005* (2013.01); *H04L 1/0061* (2013.01); *H04L 5/0094* (2013.01)

(58) Field of Classification Search
CPC ... H04L 5/0094; H04L 5/0096; H04L 5/0092; H04L 5/0051; H04L 1/0005; H04L 1/0003; H04L 1/0002; H04L 1/004; H04L 1/0041; H04L 1/0045; H04L 1/0046; H04L 1/0067; H04L 1/0057
See application file for complete search history.

(56) References Cited

U.S. PATENT DOCUMENTS

| | | | |
|---|---|---|---|
| 2018/0167932 A1* | 6/2018 | Papasakellariou | .... H04L 1/1887 |
| 2019/0059057 A1* | 2/2019 | Peng | ............... H04W 52/262 |
| 2020/0177308 A1* | 6/2020 | Lee | .................. H04L 5/0044 |
| 2020/0267667 A1* | 8/2020 | MolavianJazi | ..... H04W 52/365 |
| 2020/0351923 A1* | 11/2020 | Karaki | ............. H04W 72/1278 |
| 2021/0105787 A1* | 4/2021 | Park | ................... H04W 72/085 |
| 2021/0314953 A1* | 10/2021 | Park | ................... H04W 72/046 |
| 2021/0321291 A1* | 10/2021 | Yeo | ....................... H04L 1/0002 |
| 2021/0359817 A1* | 11/2021 | Nam | ..................... H04L 1/0025 |
| 2021/0376898 A1* | 12/2021 | Levitsky | .............. H04W 24/10 |

(Continued)

FOREIGN PATENT DOCUMENTS

| | | | | |
|---|---|---|---|---|
| CA | 3065550 A1 | * | 12/2018 | ......... H04L 5/0094 |
| CN | 109644430 A | * | 4/2019 | ......... H04L 5/0064 |
| CN | 109906572 B | * | 2/2022 | ......... H04L 1/0079 |

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication that the UE supports communications having a first transport block applied to demodulation reference signals (DMRSs) and a second transport block applied to data symbols of a data channel. The UE may transmit an uplink communication or receiving a downlink communication having the first transport block applied to the DMRSs and the second transport block applied to the data symbols of the data channel. Numerous other aspects are provided.

30 Claims, 8 Drawing Sheets

(56) References Cited

U.S. PATENT DOCUMENTS

2022/0021502 A1* 1/2022 Horn .................... H04L 1/0003
2022/0078058 A1  3/2022 Horn et al.
2022/0123889 A1* 4/2022 Levitsky ............... H04L 5/0048
2022/0183002 A1* 6/2022 Yeo ...................... H04L 5/0094

* cited by examiner

TRANSPORT BLOCK DEFINITIONS FOR DIFFERENTIAL DATA-AIDED DEMODULATION REFERENCE SIGNALS

CROSS-REFERENCE TO RELATED APPLICATION

This Patent Application claims priority to U.S. Provisional Patent Application No. 62/705,874, filed on Jul. 20, 2020, entitled "TRANSPORT BLOCK DEFINITIONS FOR DIFFERENTIAL DATA-AIDED DEMODULATION REFERENCE SIGNALS," and assigned to the assignee hereof. The disclosure of the prior Application is considered part of and is incorporated by reference in this patent Application.

FIELD OF THE DISCLOSURE

Aspects of the present disclosure generally relate to wireless communication and to techniques and apparatuses for transport block definitions for differential data-aided demodulation reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting an indication that the UE supports communications having a first transport block applied to demodulation reference signals (DMRSs) and a second transport block applied to data symbols of a data channel; and transmitting an uplink communication or receiving a downlink communication having the first transport block applied to the DMRSs and the second transport block applied to the data symbols of the data channel.

In some aspects, a method of wireless communication performed by a base station includes: receiving an indication that a UE supports communications having a first transport block applied to DMRSs and a second transport block applied to data symbols of a data channel; and transmitting a downlink communication or receiving an uplink communication having the first transport block applied to the DMRSs and the second transport block applied to the data symbols of the data channel.

In some aspects, a UE for wireless communication includes: a memory; and one or more processors coupled to the memory, the one or more processors configured to: transmit an indication that the UE supports communications having a first transport block applied to DMRSs and a second transport block applied to data symbols of a data channel; and transmit an uplink communication or receive a downlink communication having the first transport block applied to the DMRSs and the second transport block applied to the data symbols of the data channel.

In some aspects, a base station for wireless communication includes: a memory; and one or more processors coupled to the memory, the one or more processors configured to: receive an indication that a UE supports communications having a first transport block applied to DMRSs and a second transport block applied to data symbols of a data channel; and transmit a downlink communication or receive an uplink communication having the first transport block applied to the DMRSs and the second transport block applied to the data symbols of the data channel.

In some aspects, a non-transitory computer-readable medium storing a set of instructions for wireless communication includes: one or more instructions that, when executed by one or more processors of a UE, cause the UE to: transmit an indication that the UE supports communications having a first transport block applied to DMRSs and a second transport block applied to data symbols of a data channel; and transmit an uplink communication or receive a downlink communication having the first transport block applied to the DMRSs and the second transport block applied to the data symbols of the data channel.

In some aspects, a non-transitory computer-readable medium storing a set of instructions for wireless communication includes: one or more instructions that, when executed by one or more processors of a base station, cause the base station to: receive an indication that a UE supports communications having a first transport block applied to DMRSs and a second transport block applied to data symbols of a data channel; and transmit a downlink communication or receive an uplink communication having the first transport block applied to the DMRSs and the second transport block applied to the data symbols of the data channel.

In some aspects, an apparatus for wireless communication includes: means for transmitting an indication that the apparatus supports communications having a first transport block applied to DMRSs and a second transport block applied to data symbols of a data channel; and means for transmitting an uplink communication or receiving a downlink communication having the first transport block applied to the DMRSs and the second transport block applied to the data symbols of the data channel.

In some aspects, an apparatus for wireless communication includes: means for receiving an indication that a UE supports communications having a first transport block applied to DMRSs and a second transport block applied to data symbols of a data channel; and means for transmitting a downlink communication or receiving an uplink communication having the first transport block applied to the DMRSs and the second transport block applied to the data symbols of the data channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
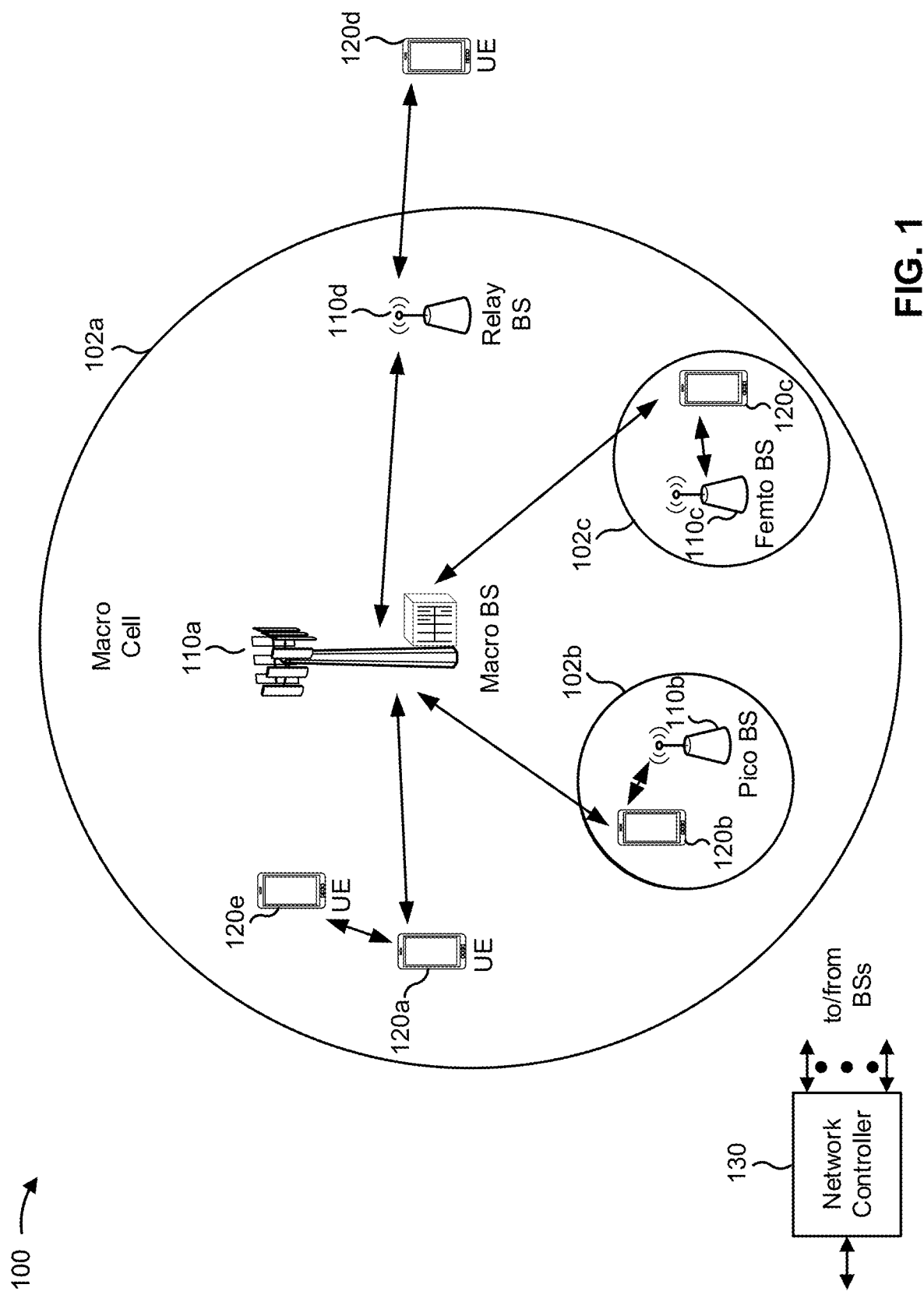
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
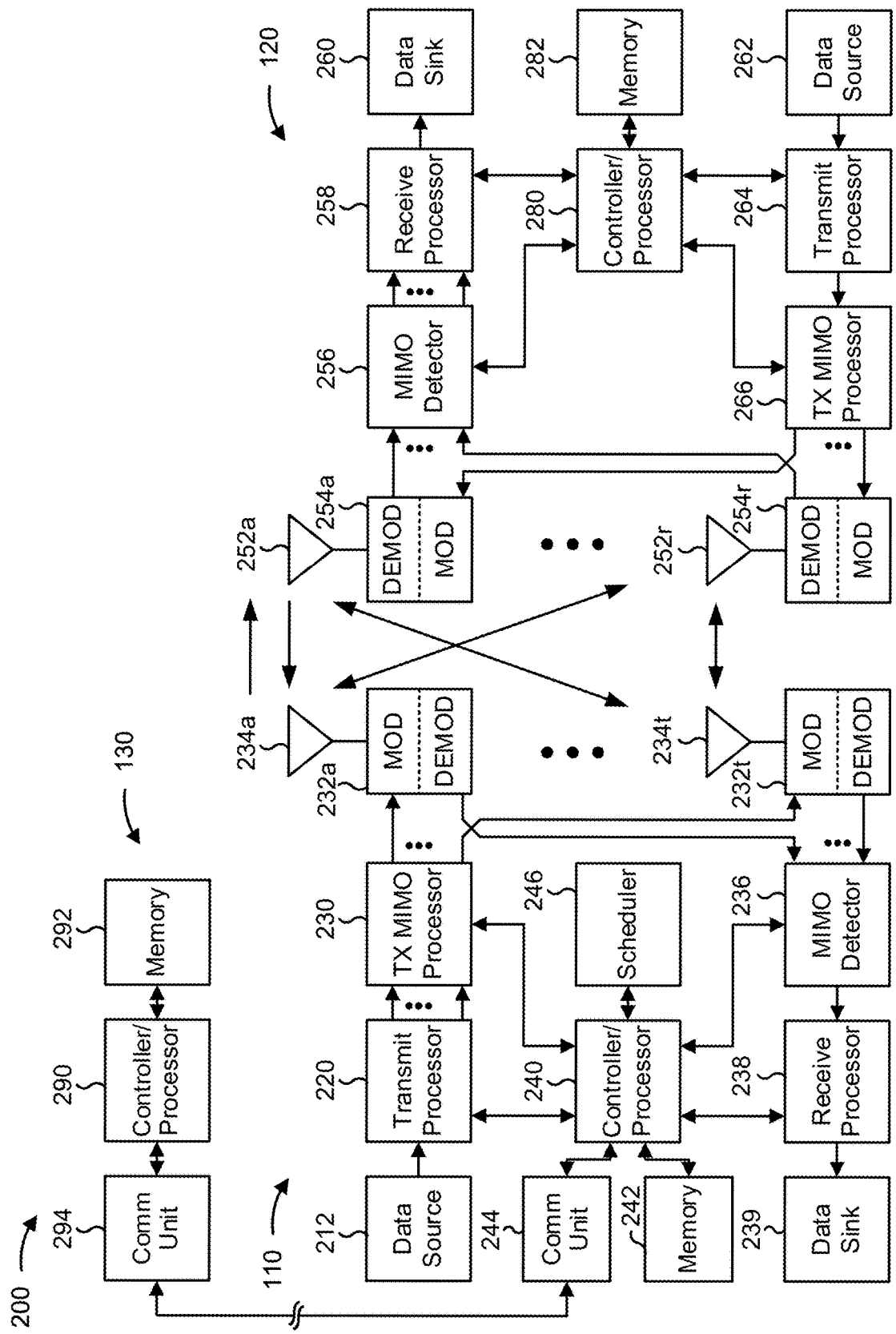
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with transport block definitions for differential data-aided DMRSs, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for transmitting an indication that the UE supports communications having a first transport block applied to DMRSs and a second transport block applied to data symbols of a data channel; means for transmitting an uplink communication or receiving a downlink communication having the first transport block applied to the DMRSs and the second transport block applied to the data symbols of the shared channel; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication that a UE supports communications having a first transport block applied to DMRSs and a second transport block applied to data symbols of a data channel; means for transmitting a downlink communication or receiving an uplink communication having the first transport block applied to the DMRSs and the second transport block applied to the data symbols of the shared channel; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
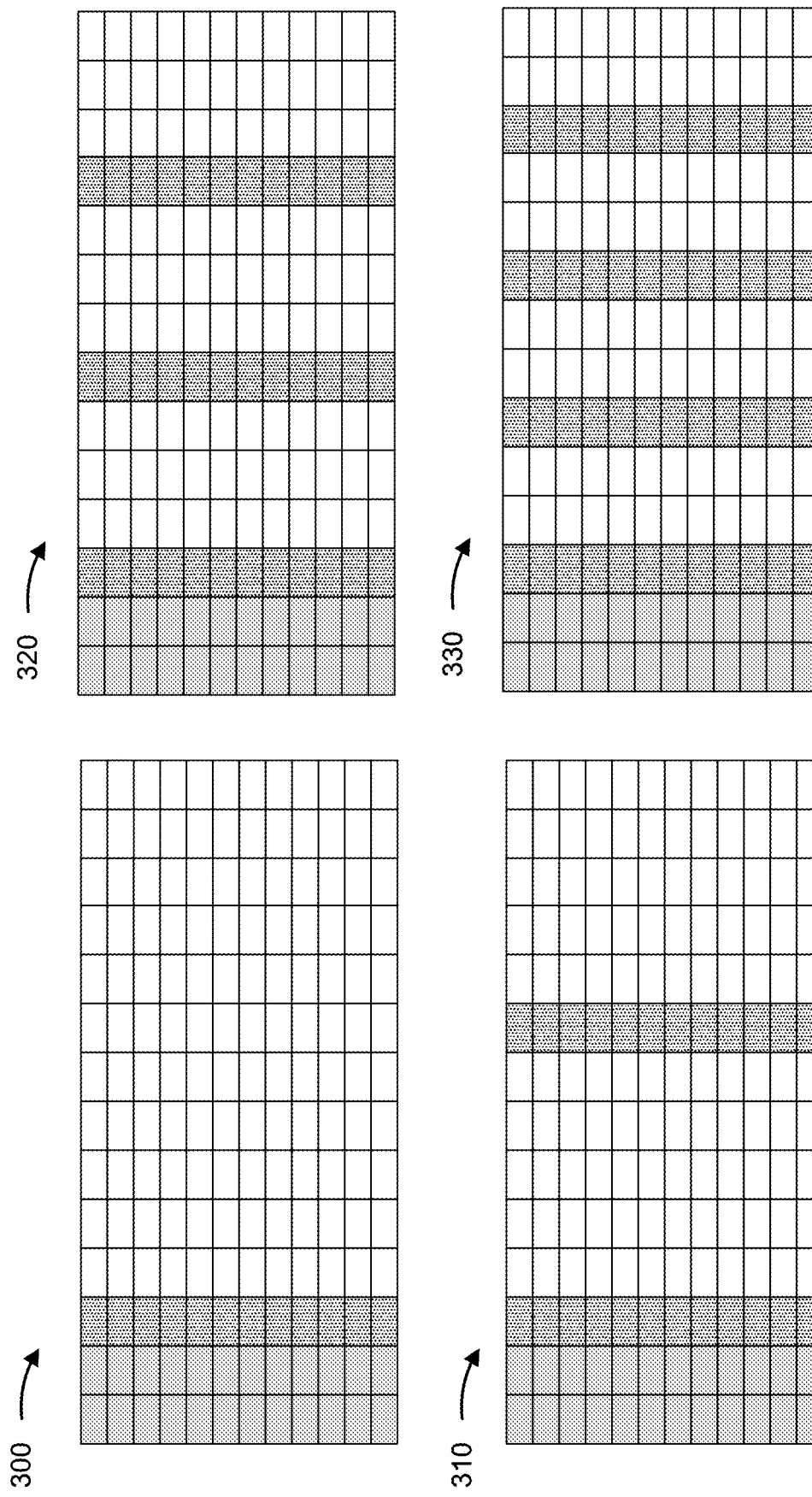
FIGS. 3 and 4 are diagrams illustrating example demodulation reference signal (DMRS) patterns, in accordance with the present disclosure.

FIG. 3 is a diagram illustrating examples 300, 310, 320, and 330 of DMRS patterns, in accordance with the present disclosure. The DMRS patterns may be used in a data transmission to facilitate channel equalization, demodulation, decoding and/or the like by a receiving device. For example, a UE may receive a downlink communication having a control channel (e.g., a physical downlink control channel (PDCCH)), data symbols of a data channel (e.g., a physical downlink shared channel (PDSCH)), and one or more occasions of DMRSs (e.g., occupying one or more symbols of the data channel). In other examples, a base station may receive an uplink communication having a control channel (e.g., a physical uplink control channel (PUCCH)), a data channel (e.g., a physical uplink shared channel (PUSCH)), and one or more occasions of DMRSs (e.g., occupying one or more symbols of the PUSCH). In other examples, a base station may receive a sidelink communication having a control channel (e.g., a physical sidelink control channel (PSCCH)), a data channel (e.g., a physical sidelink shared channel (PSSCH)), and one or more occasions of DMRSs (e.g., occupying one or more symbols of the PSSCH).

As shown by reference number 300, a communication (e.g., an uplink communication, a downlink communication, a sidelink communication, and/or the like) may include one DMRS occasion. As shown, the one DMRS occasion may occupy a first symbol of a data channel (e.g., before a first data symbol of the data channel).

As shown by reference number 310, a communication (e.g., an uplink communication, a downlink communication, a sidelink communication, and/or the like) may include two DMRS occasions. As shown, a first of the two DMRS occasions may occupy a first symbol of a data channel (e.g., before a first data symbol of the data channel) and a second of the two DMRS occasions may occupy a subsequent symbol.

As shown by reference number 320, a communication (e.g., an uplink communication, a downlink communication, a sidelink communication, and/or the like) may include three DMRS occasions. As shown, a first of the three DMRS occasions may occupy a first symbol of a data channel (e.g., before a first data symbol of the data channel) and a second and a third of the three DMRS occasions may occupy subsequent symbols.

As shown by reference number 330, a communication (e.g., an uplink communication, a downlink communication, a sidelink communication, and/or the like) may include four DMRS occasions. As shown, a first of the four DMRS occasions may occupy a first symbol of a data channel (e.g., before a first data symbol of the data channel) and a second, a third, and a fourth of the four DMRS occasions may occupy subsequent symbols.

As indicated above, FIG. 3 is provided as an example. Other examples may differ from what is described with regard to FIG. 3.

Figure 4:
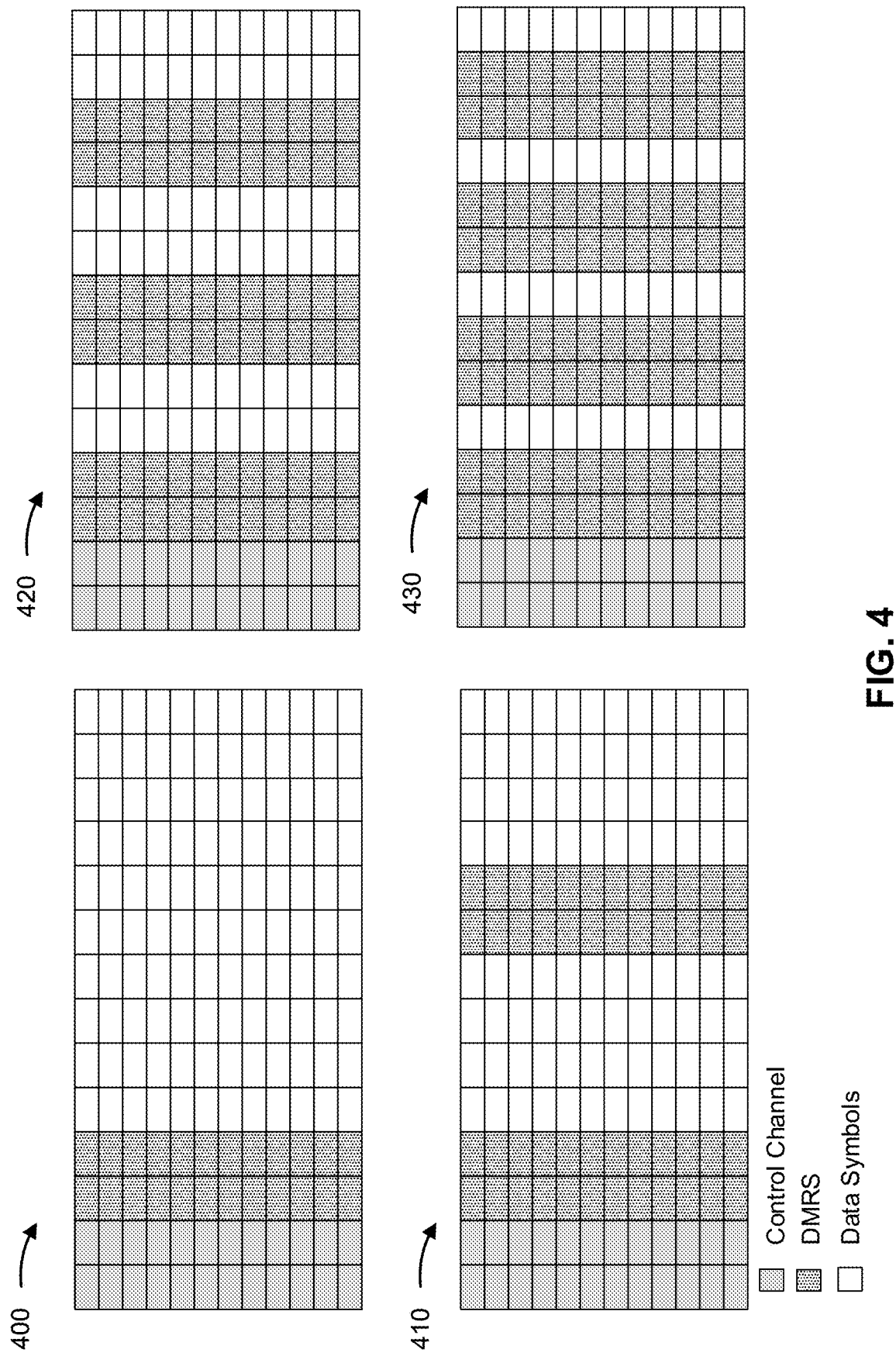

FIG. 4 is a diagram illustrating examples 400, 410, 420, and 430 of DMRS patterns, in accordance with the present disclosure. As described relative to FIG. 4, the DMRS patterns may be used in a data transmission to facilitate channel equalization, demodulation, decoding and/or the like by a receiving device.

As shown by reference number 400, a communication (e.g., an uplink communication, a downlink communication, a sidelink communication, and/or the like) may include one DMRS occasion that occupies multiple consecutive symbols (e.g., two symbols). As shown, the one DMRS occasion may occupy a first symbol and a second symbol of a data channel (e.g., before a first data symbol of the data channel).

As shown by reference number 410, a communication (e.g., an uplink communication, a downlink communication, a sidelink communication, and/or the like) may include two DMRS occasions. As shown, a first of the two DMRS occasions may occupy a first symbol and a second symbol of a data channel (e.g., before a first data symbol of the data channel) and a second of the two DMRS occasions may occupy subsequent symbols.

As shown by reference number 420, a communication (e.g., an uplink communication, a downlink communication, a sidelink communication, and/or the like) may include three DMRS occasions. As shown, a first of the three DMRS occasions may occupy a first symbol and a second symbol of a data channel (e.g., before a first data symbol of the data channel) and a second and a third of the three DMRS occasions may occupy subsequent symbols.

As shown by reference number 430, a communication (e.g., an uplink communication, a downlink communication, a sidelink communication, and/or the like) may include four DMRS occasions. As shown, a first of the four DMRS occasions may occupy a first symbol and a second symbol of a data channel (e.g., before a first data symbol of the data channel) and a second, a third, and a fourth of the four DMRS occasions may occupy subsequent symbols.

As indicated above, FIG. 4 is provided as an example. Other examples may differ from what is described with regard to FIG. 4.

In wireless communications, DMRSs may consume communication resources and reduce a number of data symbols that may be transmitted within a data channel. However, a number of DMRSs transmitted may be based at least in part on a number necessary to achieve a sufficiently high quality of channel estimation and channel equalization to demodulate and decode the data symbols. DMRSs may be allocated on, for example, four resource elements (e.g., for DMRS Type 1 configuration), 6 resource elements (e.g., for DMRS Type 2 configuration), and/or the like. Multiple ports may be applied on a same set of resource elements with orthogonal code separation using orthogonal cover codes (OCCs). For some wireless communications, up to four ports may be applied on a same set of resource elements (e.g., for a set of ports for a same code division multiplexing (CDM) group).

In some aspects described herein, a data channel may include data-aided DMRSs in which a transmitting device (e.g., UE 120, base station 110, and/or the like) may transmit DMRSs having data multiplexed with a DMRS sequence in resources allocated for DMRSs (e.g., DMRS symbols). In some aspects, the data-aided DMRSs may be differential data-aided DMRSs in which the resources allocated for DMRSs include differential modulated data. A receiving device (e.g., UE 120, base station 110, and/or the like) may decode (e.g., without additional pilots) noncoherent differential modulated data carried on the resources allocated for DMRSs. The receiving device may decode the noncoherent differential modulated data, modulate the noncoherent differential modulated data, and then use the noncoherent differential modulated data as pilots for the data channel (e.g., to decode other data carried on resources allocated for DMRSs, data, and/or the like).

In some aspects, data carried on DMRSs (e.g., DMRSs symbols) may be defined within a transport block (TB) that is separate from a TB that defines data carried on data symbols of the data channel. In some aspects, the TB that defines the data carried on DMRSs may be segmented into code blocks to improve latency of the data carried on the DMRSs. For example, a code block of the TB that defines the data carried on the DMRSs may be defined within a single DMRS occasion (e.g., a first DMRS occasion). In this way, the code block may be decoded after receiving the single DMRS occasion without requiring the receiving device to wait until receiving an entire slot to decode the code block. This may facilitate transmission and reception of low latency data, such as low latency hybrid automatic repeat request (HARD) feedback, physical security information management information, alerts (e.g., warnings associated with vehicle to anything communications), and/or the like. In this way, a transmitting device and a receiving device may conserve computing, network, and communication resources that may otherwise be used to communicate with resources dedicated to DMRSs only, to signal additional low latency communications, and/or the like.

Figure 5:
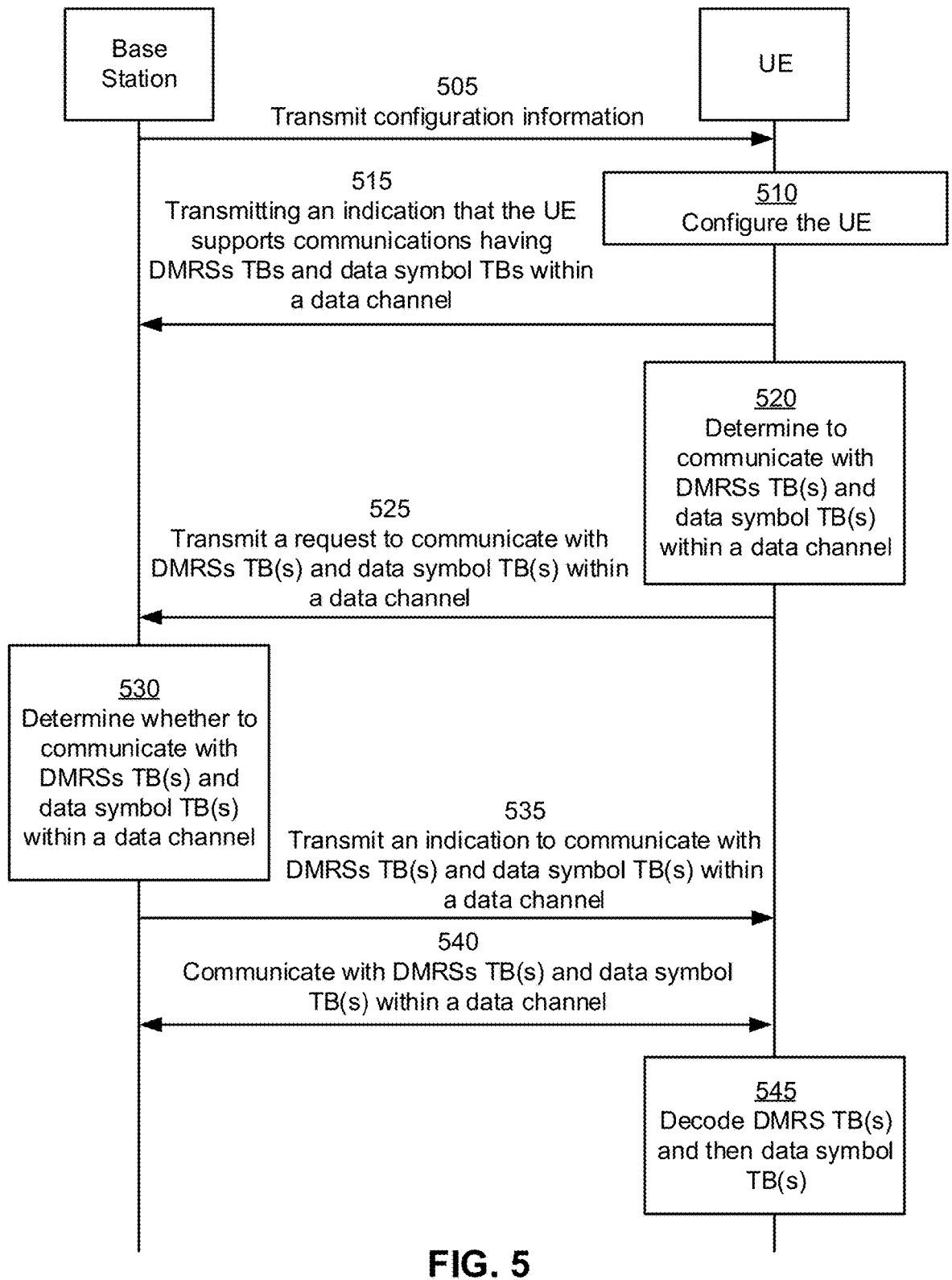
FIGS. 5 and 6 are diagrams illustrating examples associated with transport block definitions for differential data-aided demodulation reference signals, in accordance with the present disclosure.

FIG. 5 is a diagram illustrating an example 500 associated with transport block definitions for differential data-aided demodulation reference signals, in accordance with the present disclosure. As shown in FIG. 5, a UE (e.g., UE 120) may communicate with a base station (e.g., base station 110). The UE and the base station may be part of a wireless network (e.g., wireless network 100).

As shown by reference number 505, the base station may transmit, and the UE may receive, configuration information. In some aspects, the UE may receive configuration information from another device (e.g., from another base station, another UE, and/or the like), a communication standard (e.g., a telecommunication standard), and/or the like. In some aspects, the UE may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to provide an indication of a capability of the UE to support communications having DMRS TBs and data symbol TBs within a data channel (e.g., for a PUSCH, a PDSCH, and/or the like). In some aspects, the configuration information may indicate that the base station may communicate using communications having DMRS TBs and data symbol TBs within a data channel. For example, the base station may be configured to communicate using communications having DMRS TBs and data symbol TBs within a data channel based at least in part on receiving a request from the UE, based at least in part on a determination by the base station that dedicated DMRS symbols are unnecessary, and/or the like. In some aspects, the configuration information may indicate that the UE is to be configured to communicate using communications having DMRS TBs and data symbol TBs within a data channel for a single transmission (e.g., uplink or downlink), a specified number of transmissions, a set of transmissions scheduled by a configured grant, transmissions within a specified time period, and/or the like.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the UE may transmit, and the base station may receive, an indication of a capability of the UE to communicate (e.g., one or more of uplink transmissions or downlink transmissions) using communications having DMRS TBs and data symbol TBs within a data channel. In other words, the UE may transmit an indication that the UE supports communications having a first transport block applied to DMRSs and a second transport block applied to data symbols of a data channel. For example, the UE may indicate a capability of the UE to communicate using communications having DMRS TBs and data symbol TBs within a data channel based at least in part on the UE being configured to decode noncoherent differential modulated data, modulate the noncoherent differential modulated data, and then use the noncoherent differential modulated data as pilots for the data channel. In some aspects, the UE may transmit the indication via RRC signaling and/or one or more MAC CEs.

As shown by reference number 520, the UE may determine to communicate using communications having DMRS TBs and data symbol TBs within a data channel for one or more uplink transmissions or downlink transmissions. In some aspects, the UE may determine to communicate using communications having DMRS TBs and data symbol TBs within a data channel based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, a signal to interference plus noise ratio (SINR) that satisfies a threshold, and/or the like. In some aspects, the UE may determine to communicate using communications having DMRS TBs and data symbol TBs within a data channel based at least in part on current metrics, predicted metrics, and/or the like.

As shown by reference number 525, the UE may transmit, and the base station may receive, a request to communicate using communications having DMRS TBs and data symbol TBs within a data channel. In some aspects, the UE may transmit the request via a PUSCH transmission. In some aspects, the request may include a single bit indicator of whether or not DMRS TBs and data symbol TBs within a data channel are requested for one transmission (uplink or downlink), a set of transmissions, and/or the like.

For example, the UE may transmit a request, for an uplink transmission or a downlink transmission, to communicate using communications having DMRS TBs and data symbol TBs within a data channel. In some aspects, the request may apply to a single subsequent downlink transmission or uplink transmission, a set of downlink transmissions or a set of uplink transmissions scheduled by a configured grant, a specified number of downlink transmissions or uplink transmissions, downlink transmissions or uplink transmissions within a specified time period, and/or the like.

In some aspects, the request may include an indication (e.g., an implicit indication or an explicit indication) that the UE supports communications using communications having DMRS TBs and data symbol TBs within a data channel. In some aspects, the request shown at reference number 525 may include the indication shown at reference number 515. In other words, based at least in part on the UE transmitting the request, the base station may interpret the request as an implied indication that the UE supports communications using communications having DMRS TBs and data symbol TBs within a data channel.

As shown by reference number 530, the base station may determine whether to communicate using communications having DMRS TBs and data symbol TBs within a data channel. For example, the base station may determine whether to comply with a request from the UE to communicate using communications having DMRS TBs and data symbol TBs within a data channel, the base station may determine, independently from a request from the UE, to communicate using communications having DMRS TBs and data symbol TBs within a data channel, and/or the like. In some aspects, the base station may determine to not comply with a request from the UE based at least in part on one or more metrics, such as an amount of buffered data for a downlink transmission, an MCS for upcoming communications, a predicted change of conditions for SINR, and/or the like.

In some aspects, the base station may determine, independently from a request from the UE, to communicate (e.g., uplink transmissions or downlink transmissions) using communications having DMRS TBs and data symbol TBs within a data channel. For example, the base station may determine to communicate using communications having DMRS TBs and data symbol TBs within a data channel based at least in part on one or more metrics, such as a network load associated with the base station, an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, an SINR that satisfies a threshold, and/or the like. In some aspects, the base station may determine to communicate using communications having DMRS TBs and data symbol TBs within a data channel based at least in part on current metrics, predicted metrics, and/or the like.

As shown by reference number 535, the base station may transmit, and the UE may receive, an indication to communicate using communications having DMRS TBs and data symbol TBs within a data channel. For example, the indication may indicate that base station has approved a request from the UE, that the base station has determined to communicate using communications having DMRS TBs and data symbol TBs within a data channel, and/or the like. In some aspects, the base station may provide the indication via a downlink control information (DCI) message (e.g., using one or more bits), a MAC CE, and/or the like.

In some aspects, the indication to communicate using communications having DMRS TBs and data symbol TBs within a data channel may include an indication that a DMRS TB (e.g., a TB applied to DMRSs) includes one or more code blocks. In some aspects, the indication may indicate that one or more DMRS occasions include an integer number of the one or more code blocks. In some aspects, the indication may identify a first MCS associated with the DMRS TB and a second MCS associated with the PDSCH that is equal to or different from (e.g., greater than) the first MCS.

In some aspects, the indication to communicate using communications having DMRS TBs and data symbol TBs within a data channel may include an indication that code blocks of the DMRS TB have a same code block length. In some aspects, the indication may indicate a number of code blocks of the DMRS TB.

In some aspects, the indication to communicate using communications having DMRS TBs and data symbol TBs within a data channel may indicate that one or more code blocks of the DMRS TB may include a repetition of a repeated code block of the DMRS TB. For example, the repeated code block may occupy at least part of a first DMRS occasion and the one or more code blocks that include the repetition may occupy at least part of a second DMRS occasion to provide time diversity for the code block. In other examples, the repeated code block may occupy a first set of subcarriers of a DMRS occasion and the one or more code blocks that include the repetition may occupy a second set of subcarriers of the DMRS occasion to provide frequency diversity for the code block.

As shown by reference number 540, the UE and the base station may communicate using communications having DMRS TBs and data symbol TBs within a data channel. For example, the UE and the base station may communicate uplink transmissions and/or downlink transmissions using communications having DMRS TBs and data symbol TBs within a data channel.

In some aspects, the UE may communicate the uplink transmission or the downlink transmission based at least in part on an assumption, based at least in part on transmitting the request, that the uplink transmission or the downlink transmission is to be transmitted having DMRS TBs and data symbol TBs within a data channel. In other words, the UE may assume, without receiving additional signaling to confirm, that the base station will comply with the request to communicate using communications having DMRS TBs and data symbol TBs within a data channel.

In some aspects, a DMRS occasion may be associated with one or more cyclic redundancy checks (CRCs) (e.g., for one or more code blocks within the DMRS occasion). In this way, the UE may determine whether the UE successfully decoded one or more code blocks within the DMRS occasion.

As shown by reference number 545, the UE may decode downlink transmissions and/or encode uplink transmissions having the first transport block applied to the DMRSs and the second transport block applied to the data symbols of the data channel. In some aspects, the UE may decode noncoherent differential modulated data of the DMRS TB, modulate the noncoherent differential modulated data, and then use the noncoherent differential modulated data as pilots for the data channel. In some aspects, the UE may determine that a first code block of the first transport block fails a first CRC, perform channel equalization based at least in part on extrapolating or interpolating a channel estimation using one or more DMRSs (e.g., associated with a different code block), and perform demodulation, decoding, and/or a second CRC on the first code block.

For example, the UE may determine that a first data code block failed a CRC, the UE may use channel estimation from a second code block and/or a third code block that passed CRC to interpolate and/or extrapolate to the first code block and perform a second decoding iteration using channel estimation based at least in part on the second code block and/or the third code block. In some aspects, if there are three DMRS symbols with 1 code block per DMRS, and a code block in a second DMRS symbol fails CRC, the UE may perform channel interpolation from a first DMRS and a third DMRS that did pass CRC. This process of differential de-modulation may gain several dBs from using maximum likelihood estimation with channel estimation and may improve performance.

Based at least in part on segmenting DMRS code blocks to be contained within single DMRS occasions, the DMRS code blocks may be decoded after receiving the single DMRS occasions without requiring the receiving device to wait until receiving an entire slot to decode the DMRS code blocks. This may facilitate transmission and reception of low latency data, such as low latency HARQ feedback, security information, warnings (e.g., associated with vehicle to anything communications), one or more MAC CEs, and/or the like. In this way, a transmitting device and a receiving device may conserve computing, network, and communication resources that may otherwise be used to communicate with resources dedicated to DMRSs only, to signal additional low latency communications, and/or the like.

As indicated above, FIG. 5 is provided as an example. Other examples may differ from what is described with respect to FIG. 5.

Figure 6:
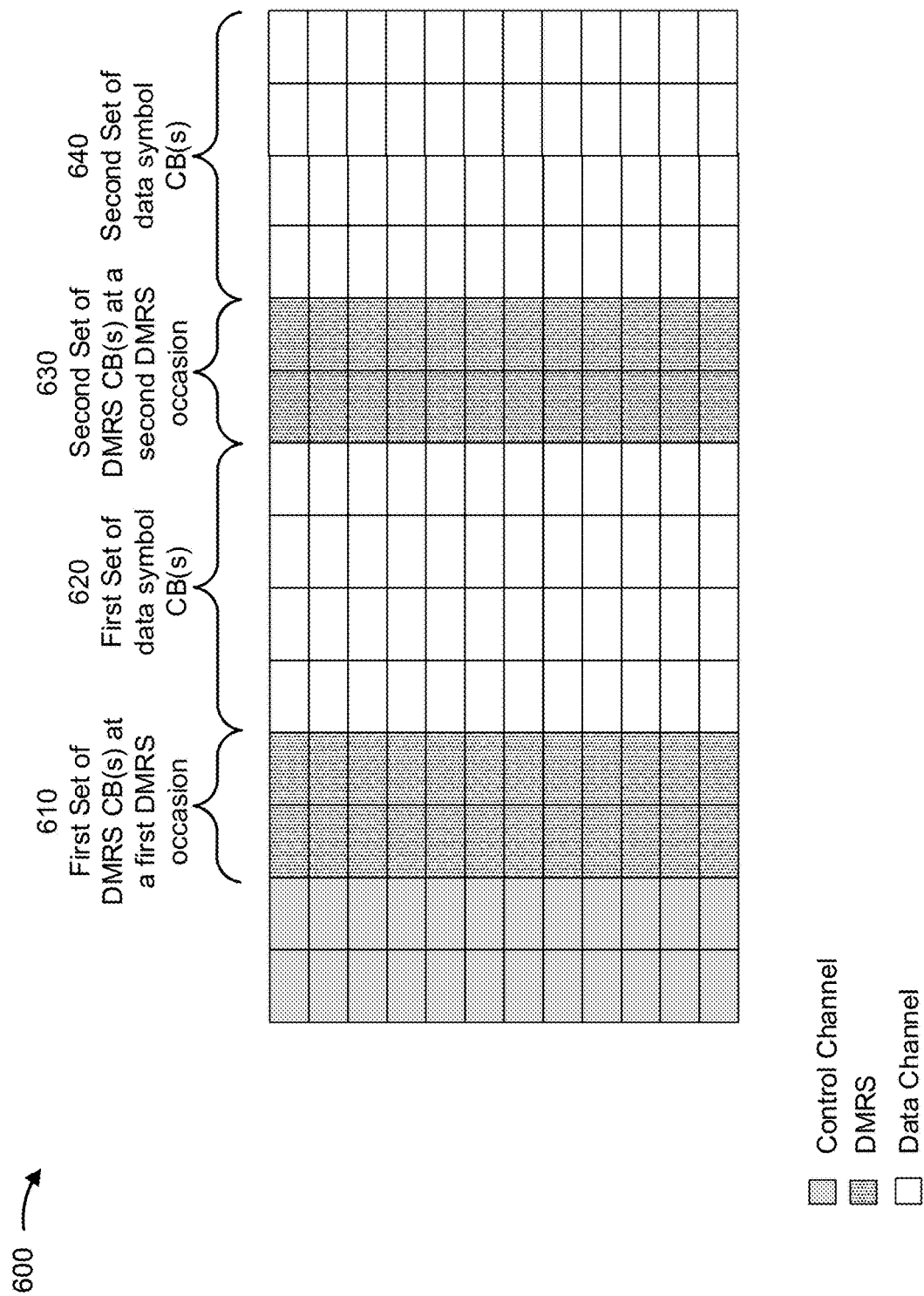

FIG. 6 is a diagram illustrating an example associated with transport block definitions for differential data-aided demodulation reference signals in a data channel 600, in accordance with the present disclosure. A UE (e.g., UE 120) may communicate with a base station (e.g., base station 110) using the example data channel 600. The UE and the base station may be part of a wireless network (e.g., wireless network 100). As shown in FIG. 6, the data channel 600 may include a first set of one or more DMRS code blocks (CBs) at a first DMRS occasion 610, a first set of one or more data symbol code blocks 620, a second set of one or more DMRS code blocks at a second DMRS occasion 630, and a second set of one or more data symbol code blocks 640.

The first set of one or more DMRS code blocks at the first DMRS occasion 610 and the second set of one or more DMRS code blocks at the second DMRS occasion 630 may each include two symbols of DMRSs. In some aspects, each of the first set of one or more DMRS code blocks at the first DMRS occasion 610 the second set of one or more DMRS code blocks at the second DMRS occasion 630 may include one DMRS code block or multiple DMRS code blocks. In some aspects, the multiple DMRS code blocks may each have a same code block length. In some aspects, a number of the multiple DMRS code blocks may be based at least in part on a product of a number of DMRS occasions and an integer (e.g., without code blocks divided between multiple DMRS occasions).

In some aspects, a number of code blocks of the DMRS TB may be defined as $$N_{CB} = N_{DMRS} * \underset{k=integer}{\mathrm{argmin}}\left(\frac{TB_{size}}{k*N_{DMRS}} < K_{cb}\right),$$

and a code block length (e.g., including a CRC) may be defined as:

$$\mathrm{ceil}\left(\frac{TB_{size}}{k*N_{DMRS}}\right),$$

where $N_{DMRS}$ is a number of DMRSs, $TB_{size}$ is a TB size such that:

$$TB_{size}=N_{DMRS}*N_{DMRS_{REs}}*N_{QAM_{order}}*\mathrm{Rate}_{DMRS}*v \text{ (including CRC bits)},$$

where $N_{DMRS\_REs}$ is a number of available resource elements for one DMRS symbol for one port, $\mathrm{Rate}_{DMRS}$ is a DMRS data rate (e.g., determined from a DMRS MCS), $K_{cb}$ is a maximum allowable size of code block, and v is a number of layers equal to a number of ports on a set of the same resource elements (assuming same MCS for all ports). A number of layers may be defined as 1 for additional redundancy (layers diversity). In some aspects, zero padding may be added on a first code block, similar to PDSCH segmentation.

In an example, a data channel has 50 resource blocks with 2 DMRS occasions with durations of 2 symbols (e.g., a total of 4 DMRS symbols) and 4 ports using DMRS Type 1 configuration with different layers per port. This means that the data channel has 300 resource elements per DMRS occasion. For a quadrature phase shift keying (QPSK) and a $\mathrm{Rate}_{DMRS}$ of ⅓, there may be 6 bits per resource element per layer. A total TB size may be:

$$TB_{size}=2_{DMRSs}*300_{REs}*2_{QAMorder}*\tfrac{1}{3}_{Rate_{DMRS}}*4_{Layers}=3200 \text{ bits},$$

with each DMRS occasion having one or more code blocks that total 1600 bits.

In some aspects, a DMRS TB may have a size defined based at least in part on fixed payload sizes for different feedback types. The fixed payload sizes may be dependent on different allocations (e.g., a number of resource blocks) and DMRS type. The UE and/or the base station may select a payload having a biggest payload size and/or feedback type from a predefined list that may be transmitted over a single DMRS occasion or over multiple DMRS occasions based at least in part on a minimum code rate or MCS requirement for robustness and/or reliability of the communication. The UE and/or the base station may translate the selected payload into an encoded code block that fits (e.g., exactly) within available resources of a DMRS symbol and/or occasion. In some aspects, the UE and/or the base station may determine to apply redundancy (e.g., using a reduced code rate) for transmitting the communication. In some aspects, the TB may be defined based at least in part on a sum of payloads on all DMRSs ($N_{DMRS}$ in case payloads are defined per DMRS or less than $N_{DMRS}$ if payloads are defined for several DMRSs). In case of small payload sizes, the UE and/or the base station may use a TB size table (e.g., defined in a communication standard) to determine the TB size of the payload. In some aspects, the TB size may be defined with a number of information bits being less than or equal to 3824 with an additional small payload size for a 1 or 2 resource block allocation. These operations may be coupled to a specific feedback format (length).

Figure 7:
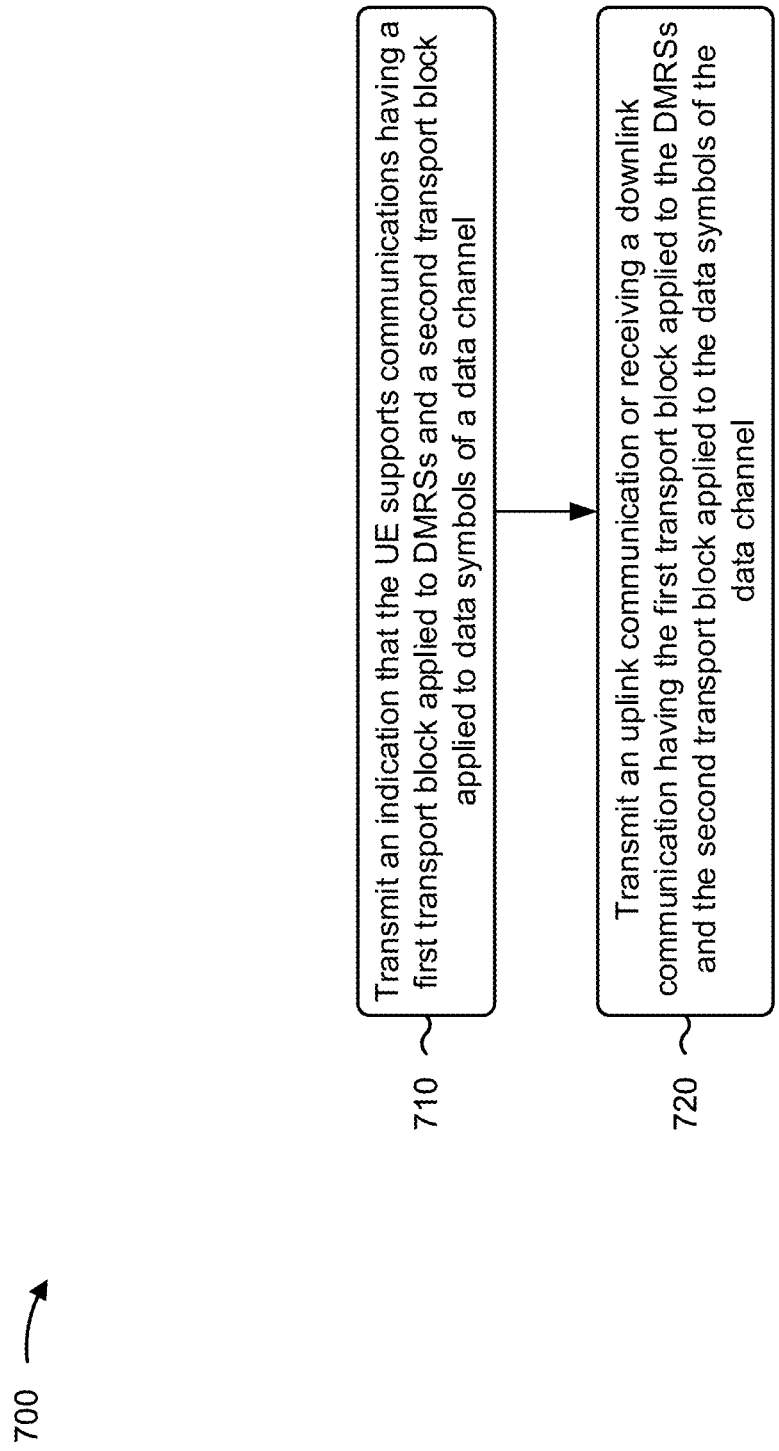
FIGS. 7 and 8 are diagrams illustrating example processes associated with transport block definitions for differential data-aided demodulation reference signals, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with TB definitions for differential data-aided DMRSs.

As shown in FIG. 7, in some aspects, process 700 may include transmitting an indication that the UE supports communications having a first transport block applied to DMRSs and a second transport block applied to data symbols of a data channel (block 710). For example, the UE (e.g., using transmit processor 264, controller/processor 280, memory 282, and/or the like) may transmit an indication that the UE supports communications having a first transport block applied to DMRSs and a second transport block applied to data symbols of a data channel, as described above.

As further shown in FIG. 7, in some aspects, process 700 may include transmitting an uplink communication or receiving a downlink communication having the first transport block applied to the DMRSs and the second transport block applied to the data symbols of the data channel (block 720). For example, the UE (e.g., using receive processor 258, transmit processor 264, controller/processor 280, memory 282, and/or the like) may transmit an uplink communication or receive a downlink communication having the first transport block applied to the DMRSs and the second transport block applied to the data symbols of the data channel, as described above.

Process 700 may include additional aspects, such as any single aspect or any combination of aspects described below and/or in connection with one or more other processes described elsewhere herein.

In a first aspect, the first transport block includes one or more code blocks, one or more DMRS occasions include an integer number of the one or more code blocks, and respective DMRS occasions, of the one or more DMRS occasions, include one or more consecutive symbols of DMRSs.

In a second aspect, alone or in combination with the first aspect, a first DMRS occasion, of the one or more DMRS occasions, is associated with one or more CRCs that are independent from other DMRS occasions of the one or more DMRS occasions.

In a third aspect, alone or in combination with one or more of the first and second aspects, the first transport block includes one or more of: feedback data associated with a previous communication, physical security information management information, one or more MAC CEs, low latency data, or an alert.

In a fourth aspect, alone or in combination with one or more of the first through third aspects, the DMRSs include data-aided DMRSs.

In a fifth aspect, alone or in combination with one or more of the first through fourth aspects, the first transport block is associated with a first MCS, and the second transport block is associated with a second MCS that is different from the first MCS.

In a sixth aspect, alone or in combination with one or more of the first through fifth aspects, code blocks of the first transport block have a same code block length.

In a seventh aspect, alone or in combination with one or more of the first through sixth aspects, a first code block of the first transport block includes a repetition of a second code block of the first transport block.

In an eighth aspect, alone or in combination with one or more of the first through seventh aspects, the first code block occupies a first DMRS occasion and the second code block occupies a second DMRS occasion that is different from the first DMRS occasion.

In a ninth aspect, alone or in combination with one or more of the first through eighth aspects, the first code block occupies a first set of subcarriers and the second code block occupies a second set of subcarriers that is different from the first set of subcarriers.

In a tenth aspect, alone or in combination with one or more of the first through ninth aspects, receiving the downlink communication includes determining that a first code block of the first transport block fails a first CRC; performing channel equalization based at least in part on extrapolating or interpolating a channel estimation using one or more DMRSs, and performing demodulation, decoding, and a second CRC on the first code block.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
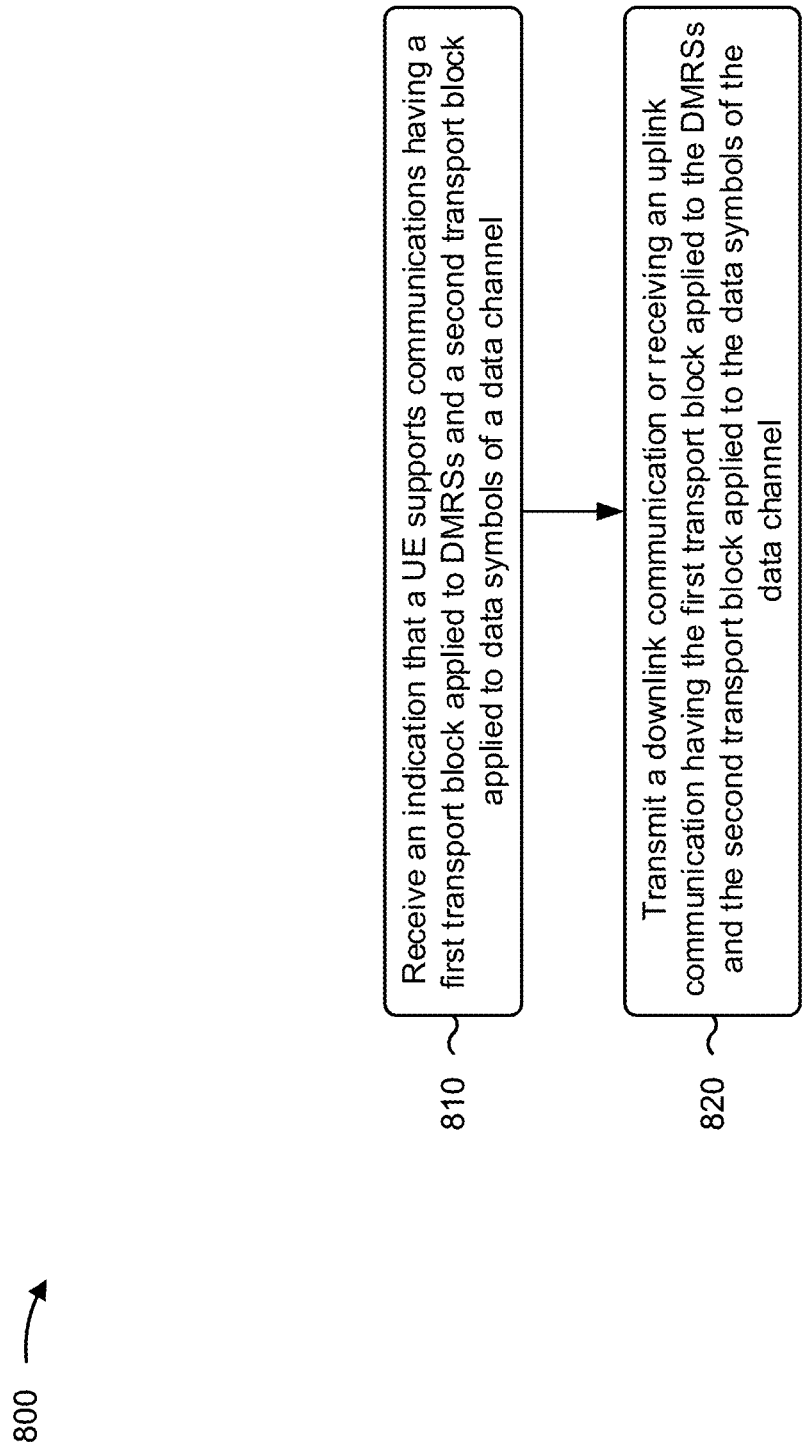

FIG. 8 is a diagram illustrating an example process 800 performed, for example, by a base station, in accordance with the present disclosure. Example process 800 is an example where the base station (e.g., base station 110 and/or the like) performs operations associated with TB definitions for differential data-aided DMRSs.

As shown in FIG. 8, in some aspects, process 800 may include receiving an indication that a UE supports communications having a first transport block applied to DMRSs and a second transport block applied to data symbols of a data channel (block 810). For example, the base station (e.g., using receive processor 238, controller/processor 240, memory 242, and/or the like) may receive an indication that a UE supports communications having a first transport block applied to DMRSs and a second transport block applied to data symbols of a data channel, as described above.

As further shown in FIG. 8, in some aspects, process 800 may include transmitting a downlink communication or receiving an uplink communication having the first transport block applied to the DMRSs and the second transport block applied to the data symbols of the data channel (block 820). For example, the base station (e.g., using transmit processor 220, receive processor 238, controller/processor 240, memory 242, and/or the like) may transmit a downlink communication or receive an uplink communication having the first transport block applied to the DMRSs and the second transport block applied to the data symbols of the data channel, as described above.

Process 800 may include additional aspects, such as any single aspect or any combination of aspects described below and/or in connection with one or more other processes described elsewhere herein.

In a first aspect, the first transport block includes one or more code blocks, one or more DMRS occasions include an integer number of the one or more code blocks, and respective DMRS occasions, of the one or more DMRS occasions, include one or more consecutive symbols of DMRSs.

In a second aspect, alone or in combination with the first aspect, a first DMRS occasion, of the one or more DMRS occasions, is associated with one or more CRCs that are independent from other DMRS occasions of the one or more DMRS occasions.

In a third aspect, alone or in combination with one or more of the first and second aspects, the first transport block includes one or more of: feedback data associated with a previous communication, physical security information management information, one or more MAC CEs, low latency data, or an alert.

In a fourth aspect, alone or in combination with one or more of the first through third aspects, the DMRSs include data-aided DMRSs.

In a fifth aspect, alone or in combination with one or more of the first through fourth aspects, the first transport block is associated with a first MCS, and the second transport block is associated with a second MCS that is different from the first MCS.

In a sixth aspect, alone or in combination with one or more of the first through fifth aspects, code blocks of the first transport block have a same code block length.

In a seventh aspect, alone or in combination with one or more of the first through sixth aspects, a first code block of the first transport block includes a repetition of a second code block of the first transport block.

In an eighth aspect, alone or in combination with one or more of the first through seventh aspects, the first code block occupies a first DMRS occasion and the second code block occupies a second DMRS occasion that is different from the first DMRS occasion.

In a ninth aspect, alone or in combination with one or more of the first through eighth aspects, the first code block occupies a first set of subcarriers and the second code block occupies a second set of subcarriers that is different from the first set of subcarriers.

In a tenth aspect, alone or in combination with one or more of the first through ninth aspects, receiving the uplink communication includes determining that a first code block of the first transport block fails a first CRC; performing channel equalization based at least in part on extrapolating or interpolating a channel estimation using one or more DMRSs, and performing a second CRC on the first code block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: transmitting an indication that the UE supports communications having a first transport block applied to demodulation reference signals (DMRSs) and a second transport block applied to data symbols of a data channel; and transmitting an uplink communication or receiving a downlink communication having the first transport block applied to the DMRSs and the second transport block applied to the data symbols of the data channel.

Aspect 2: The method of Aspect 1, wherein the first transport block comprises one or more code blocks, wherein one or more DMRS occasions include an integer number of the one or more code blocks, and wherein respective DMRS occasions, of the one or more DMRS occasions, include one or more consecutive symbols of DMRSs.

Aspect 3: The method of Aspect 2, wherein a first DMRS occasion, of the one or more DMRS occasions, is associated with one or more cyclic redundancy checks that are independent from other DMRS occasions of the one or more DMRS occasions.

Aspect 4: The method of any of Aspects 1-3, wherein the first transport block comprises one or more of: feedback data associated with a previous communication, physical security information management information, one or more medium access control control elements, low latency data, or an alert.

Aspect 5: The method of any of Aspects 1-4, wherein the DMRSs comprise data-aided DMRSs.

Aspect 6: The method of any of Aspects 1-5, wherein the first transport block is associated with a first modulation and coding scheme (MCS), and wherein the second transport block is associated with a second MCS that is different from the first MCS.

Aspect 7: The method of any of Aspects 1-6, wherein code blocks of the first transport block have a same code block length.

Aspect 8: The method of any of Aspects 1-7, wherein a first code block of the first transport block comprises a repetition of a second code block of the first transport block.

Aspect 9: The method of Aspect 8, wherein the first code block occupies a first DMRS occasion and the second code block occupies a second DMRS occasion that is different from the first DMRS occasion.

Aspect 10: The method of Aspect 8, wherein the first code block occupies a first set of subcarriers and the second code block occupies a second set of subcarriers that is different from the first set of subcarriers.

Aspect 11: The method of any of Aspects 1-10, wherein receiving the downlink communication comprises: determining that a first code block of the first transport block fails a first cyclic redundancy check; performing channel equalization based at least in part on extrapolating or interpolating a channel estimation using one or more DMRSs; and performing demodulation, decoding, and a second cyclic redundancy check on the first code block.

Aspect 12: A method of wireless communication performed by a base station, comprising: receiving an indication that a user equipment (UE) supports communications having a first transport block applied to demodulation reference signals (DMRSs) and a second transport block applied to data symbols of a data channel; and transmitting a downlink communication or receiving an uplink communication having the first transport block applied to the DMRSs and the second transport block applied to the data symbols of the data channel.

Aspect 13: The method of Aspect 12, wherein the first transport block comprises one or more code blocks, wherein one or more DMRS occasions include an integer number of the one or more code blocks, and wherein respective DMRS occasions, of the one or more DMRS occasions, include one or more consecutive symbols of DMRSs.

Aspect 14: The method of Aspect 13, wherein a first DMRS occasion, of the one or more DMRS occasions, is associated with one or more cyclic redundancy checks that are independent from other DMRS occasions of the one or more DMRS occasions.

Aspect 15: The method of any of Aspects 12-14, wherein the first transport block comprises one or more of: feedback data associated with a previous communication, physical security information management information, one or more medium access control control elements, low latency data, or an alert.

Aspect 16: The method of any of Aspects 12-15, wherein the DMRSs comprise data-aided DMRSs.

Aspect 17: The method of any of Aspects 12-16, wherein the first transport block is associated with a first modulation and coding scheme (MCS), and wherein the second transport block is associated with a second MCS that is different from the first MCS.

Aspect 18: The method of any of Aspects 12-17, wherein code blocks of the first transport block have a same code block length.

Aspect 19: The method of any of Aspects 12-18, wherein a first code block of the first transport block comprises a repetition of a second code block of the first transport block.

Aspect 20: The method of Aspect 19, wherein the first code block occupies a first DMRS occasion and the second code block occupies a second DMRS occasion that is different from the first DMRS occasion.

Aspect 21: The method of Aspect 19, wherein the first code block occupies a first set of subcarriers and the second code block occupies a second set of subcarriers that is different from the first set of sub carriers.

Aspect 22: The method of any of Aspects 12-21, wherein receiving the uplink communication comprises: determining that a first code block of the first transport block fails a first cyclic redundancy check; performing channel equalization based at least in part on extrapolating or interpolating a channel estimation using one or more DMRSs; and performing a second cyclic redundancy check on the first code block.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to cause the UE to:
      transmit an indication that the UE supports communications having a first transport block applied to data-aided demodulation reference signals (DMRSs) in which resources allocated for the data-aided DMRSs included modulated data and a second transport block applied to data symbols of a data channel; and
      transmit an uplink communication or receive a downlink communication having the first transport block applied to the data-aided DMRSs and the second transport block applied to the data symbols of the data channel.

2. The UE of claim 1, wherein the first transport block comprises one or more code blocks,
   wherein one or more DMRS occasions include an integer number of the one or more code blocks, and
   wherein respective DMRS occasions, of the one or more DMRS occasions, include one or more consecutive symbols of DMRSs.

3. The UE of claim 2, wherein a first DMRS occasion, of the one or more DMRS occasions, is associated with one or more cyclic redundancy checks that are independent from other DMRS occasions of the one or more DMRS occasions.

4. The UE of claim 1, wherein the first transport block comprises one or more of:
   feedback data associated with a previous communication,
   physical security information management information,
   one or more medium access control control elements,
   low latency data, or
   an alert.

5. The UE of claim 1, wherein the first transport block is associated with a first modulation and coding scheme (MCS), and
   wherein the second transport block is associated with a second MCS that is different from the first MCS.

6. The UE of claim 1, wherein code blocks of the first transport block have a same code block length.

7. The UE of claim 1, wherein a first code block of the first transport block comprises a repetition of a second code block of the first transport block.

8. The UE of claim 7, wherein the first code block occupies a first DMRS occasion and the second code block occupies a second DMRS occasion that is different from the first DMRS occasion.

9. The UE of claim 7, wherein the first code block occupies a first set of subcarriers and the second code block occupies a second set of subcarriers that is different from the first set of subcarriers.

10. The UE of claim 1, wherein the one or more processors, to transmit the uplink communication or receive the downlink communication, are configured to cause the UE to receive the downlink communication, and
    wherein the one or more processors, to receive the downlink communication, are configured to cause the UE to:
       determine that a first code block of the first transport block fails a first cyclic redundancy check;
       perform channel equalization based at least in part on extrapolating or interpolating a channel estimation using one or more DMRSs; and
       perform demodulation, decoding, and a second cyclic redundancy check on the first code block.

11. The UE of claim 1, wherein the data-aided DMRSs comprise differential data-aided DMRSs.

12. The UE of claim 1, wherein the data-aided DMRSs comprise data carried on DMRS symbols and multiplexed with a DMRS sequence.

13. A base station for wireless communication, comprising:
    a memory; and
    one or more processors coupled to the memory, the one or more processors configured to cause the base station to:
       receive an indication that a user equipment (UE) supports communications having a first transport block applied to data-aided demodulation reference signals (DMRSs) in which resources allocated for the data-aided DMRSs included modulated data and a second transport block applied to data symbols of a data channel; and transmit a downlink communication or receive an uplink communication having the first transport block applied to the data-aided DMRSs and the second transport block applied to the data symbols of the data channel.

14. The base station of claim 13, wherein the first transport block comprises one or more code blocks,
wherein one or more DMRS occasions include an integer number of the one or more code blocks, and
wherein respective DMRS occasions, of the one or more DMRS occasions, include one or more consecutive symbols of DMRSs.

15. The base station of claim 14, wherein a first DMRS occasion, of the one or more DMRS occasions, is associated with one or more cyclic redundancy checks that are independent from other DMRS occasions of the one or more DMRS occasions.

16. The base station of claim 13, wherein the first transport block comprises one or more of:
feedback data associated with a previous communication,
physical security information management information,
one or more medium access control control elements,
low latency data, or
an alert.

17. The base station of claim 13, wherein the first transport block is associated with a first modulation and coding scheme (MCS), and
wherein the second transport block is associated with a second MCS that is different from the first MCS.

18. The base station of claim 13, wherein code blocks of the first transport block have a same code block length.

19. The base station of claim 13, wherein a first code block of the first transport block comprises a repetition of a second code block of the first transport block.

20. The base station of claim 19, wherein the first code block occupies a first DMRS occasion and the second code block occupies a second DMRS occasion that is different from the first DMRS occasion.

21. The base station of claim 19, wherein the first code block occupies a first set of subcarriers and the second code block occupies a second set of subcarriers that is different from the first set of subcarriers.

22. The base station of claim 13, wherein the one or more processors, to transmit the downlink communication or receive the uplink communication, are configured to cause the base station to receive the uplink communication, and
wherein the one or more processors, to receive the uplink communication, are configured to cause the base station to:
determine that a first code block of the first transport block fails a first cyclic redundancy check;
perform channel equalization based at least in part on extrapolating or interpolating a channel estimation using one or more DMRSs; and
perform a second cyclic redundancy check on the first code block.

23. A method of wireless communication performed by a user equipment (UE), comprising:

transmitting an indication that the UE supports communications having a first transport block applied to data-aided demodulation reference signals (DMRSs) in which resources allocated for the data-aided DMRSs included modulated data and a second transport block applied to data symbols of a data channel; and
transmitting an uplink communication or receiving a downlink communication having the first transport block applied to the data-aided DMRSs and the second transport block applied to the data symbols of the data channel.

24. The method of claim 23, wherein the first transport block comprises one or more code blocks,
wherein one or more DMRS occasions include an integer number of the one or more code blocks, and
wherein respective DMRS occasions, of the one or more DMRS occasions, include one or more consecutive symbols of DMRSs.

25. The method of claim 24, wherein a first DMRS occasion, of the one or more DMRS occasions, is associated with one or more cyclic redundancy checks that are independent from other DMRS occasions of the one or more DMRS occasions.

26. The method of claim 23, wherein the first transport block is associated with a first modulation and coding scheme (MCS), and
wherein the second transport block is associated with a second MCS that is different from the first MCS.

27. A method of wireless communication performed by a base station, comprising:
receiving an indication that a user equipment (UE) supports communications having a first transport block applied to data-aided demodulation reference signals (DMRSs) in which resources allocated for the data-aided DMRSs included modulated data and a second transport block applied to data symbols of a data channel; and
transmitting a downlink communication or receiving an uplink communication having the first transport block applied to the data-aided DMRSs and the second transport block applied to the data symbols of the data channel.

28. The method of claim 27, wherein the first transport block comprises one or more code blocks,
wherein one or more DMRS occasions include an integer number of the one or more code blocks, and
wherein respective DMRS occasions, of the one or more DMRS occasions, include one or more consecutive symbols of DMRSs.

29. The method of claim 28, wherein a first DMRS occasion, of the one or more DMRS occasions, is associated with one or more cyclic redundancy checks that are independent from other DMRS occasions of the one or more DMRS occasions.

30. The method of claim 27, wherein the first transport block is associated with a first modulation and coding scheme (MCS), and
wherein the second transport block is associated with a second MCS that is different from the first MCS.

* * * * *